Figure 1:
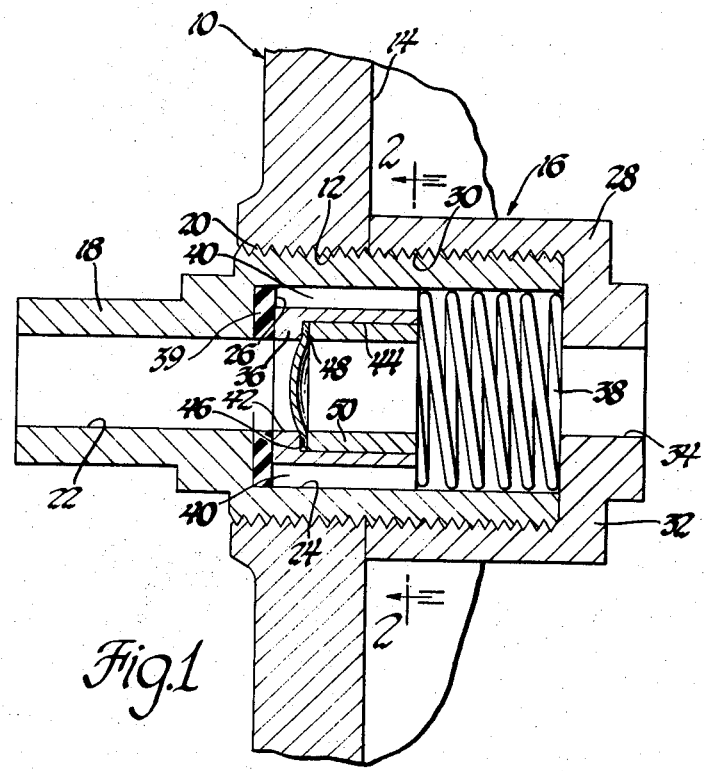

United States Patent

Dilorenzo

[15] 3,693,644

[45] Sept. 26, 1972

[54] PRESSURE VESSEL FILL AND PRESSURE RELIEF VALVE

[72] Inventor: Vincent Dilorenzo, Detroit, Mich.

[73] Assignee: General Motors Corporation, Detroit, Mich.

[22] Filed: May 20, 1971

[21] Appl. No.: 145,157

[52] U.S. Cl. .................................. 137/71, 137/493.2
[51] Int. Cl. ............................................. F16k 17/16
[58] Field of Search ...................... 137/68–71, 493.1, 137/493.2, 493.9; 220/89 A; 141/18; 62/292

[56] References Cited

UNITED STATES PATENTS

| 867,474 | 10/1907 | Campbell | 137/68 X |
|---|---|---|---|
| 1,898,899 | 2/1933 | Rowley | 137/68 |
| 2,255,774 | 9/1941 | Huffman et al. | 137/71 |
| 2,479,737 | 8/1949 | Garretson et al. | 222/3 |
| 2,562,672 | 7/1951 | Kunert et al. | 137/71 |
| 3,580,273 | 5/1971 | Schwarz | 137/493.2 |

Primary Examiner—M. Cary Nelson
Assistant Examiner—Richard Gerard
Attorney—W. E. Finken and Herbert Furman

[57] ABSTRACT

A pressure vessel includes a threaded aperture in a wall thereof which threadedly receives the outer threaded surface of a cylindrical housing. The housing includes an inlet cylindrical bore which merges across a radial wall into a like bore of larger diameter. A threaded cylindrical cap is threaded over the housing interiorly of the vessel and includes an apertured radial wall providing an outlet. The radial walls of the housing and cap and the larger diameter bore of the housing define a chamber. A hollow cylindrical valve member is slidably mounted within the chamber and includes a plurality of axial grooves in the periphery thereof. A coil compression spring seats on one end of the valve member and the radial wall of the cap to seat the other end of the valve member against the radial wall of the housing to close the grooves to the inlet. The valve member includes a counterbore and a fluid pressure rupturable diaphragm seats against the radial wall of the counterbore and is retained in place by a press fitted retainer ring to block communication between the inlet and outlet through the valve member and cooperatively define with such member a fluid pressure actuated piston. Communication of the inlet with a source of pressure fluid displaces the piston against the spring to fill the vessel through the axial grooves. Pressure relief is obtained when the diaphragm ruptures under a pressure level in the vessel exceeding a predetermined pressure.

2 Claims, 2 Drawing Figures

INVENTOR.
Vincent DiLorenzo
BY
Herbert Furman
ATTORNEY ial 3,693,644

PRESSURE VESSEL FILL AND PRESSURE RELIEF VALVE

This invention relates generally to fill and pressure relief valves for pressure vessels and more particularly to a valve having a piston which provides both the fill function when displaced under the fill pressure of pressure fluid and a relief function when ruptured by the pressure of fluid within the vessel exceeding a predetermined level.

Normally pressure vessels containing fluid under a predetermined pressure are provided with both a fill valve to fill the vessel and a pressure relief valve to permit the escape of fluid from within the vessel when the internal pressure exceeds a predetermined level. The valve of this invention combines both functions into a single unit and includes in its preferred embodiment a spring biased piston which is displaced by fill pressure from a closed position to an open position permitting communication of a source of pressure fluid with the vessel to fill the vessel. The head of the piston is provided by a rupturable diaphragm which ruptures when the pressure within the vessel exceeds a predetermined level. Thus both functions are provided without the necessity of having separate valves.

It is therefore the primary feature of this invention to provide a combined fill and pressure relief valve for pressure vessels.

Figure 2:
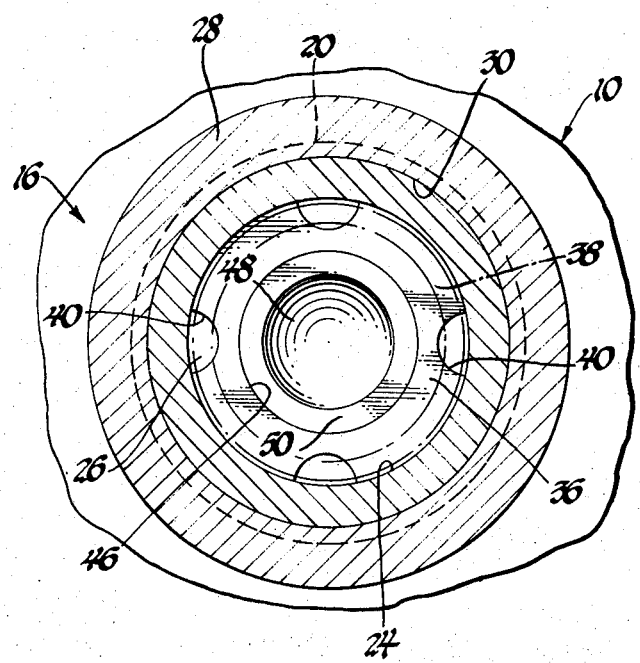

This and other features will be readily apparent from the following specification and drawings wherein:

FIG. 1 is a view in section of a pressure relief valve according to this invention installed in a wall of a pressure vessel; and FIG. 2 is a sectional view taken generally along the plane indicated by line 2—2 of FIG. 1.

Referring now to the drawings, a pressure vessel 10 is provided with a threaded aperture 12 in a wall 14 thereof and a valve 16 according to this invention is received within the threaded aperture 12 to provide both fill and pressure relief functions for the pressure vessel.

The valve 16 includes a cylindrical housing 18 having a threaded exterior wall 20 which is threaded within the aperture 12. A central cylindrical bore 22 of the housing opens to a larger bore 24 across a counterbored radial wall 26. A cap 28 includes an internal threaded bore 30 which is threaded over the wall 20 of member 18 in engagement with the inner surface of wall 14 adjacent the aperture 12. A radial wall 32 of the cap joins bore 30 with an axial bore 34 providing an outlet to the interior of the vessel. A cylindrical hollow valve member 36 is slidably received within bore 24 and a coil compression spring 38 seating between wall 32 and one end wall of member 36 normally biases this member to closed position, as shown, wherein the other end wall of the member seats against a resilient seal 39 secured within the counterbore of wall 26. Member 36 includes a plurality of axial grooves 40 in the periphery thereof as clearly shown in FIG. 2. When the member is in closed position, the grooves are closed by wall 26 and seal 39 to block any communication between the inlet 22 and the outlet 34 therethrough.

A central counterbore of member 36 includes a bore 42 merging with a larger bore 44 across a radial wall 46. A conventional domed pressure rupturable diaphragm 48 has the periphery thereof seating against wall 46 and held thereagainst by a retainer ring 50 pressure fitted within bore 44. The diaphragm cooperates with the member 36 in providing a piston.

When it is desired to fill the vessel 10, a source of pressure fluid is communicated with the inlet bore 22 to displace the piston to the right against the action of spring 38 and communicate the bore 22 with the outlet bore 34 by means of the grooves 40. The vessel can thus be filled with pressure fluid. When the source is disconnected from the bore 22, the spring 38 and the pressure within the vessel seats the piston in closed position as shown.

Should the pressure within the vessel exceed a predetermined limit, the diaphragm 48 will rupture to permit escape of the pressure fluid contents of the vessel.

Thus, this invention provides a combined pressure vessel fill and pressure relief valve.

I claim:

1. In combination with a vessel containing pressure fluid, a combined fill and pressure relief valve comprising, in combination, an annular housing assembly received within an opening in a wall of the vessel and including an annular chamber having spaced apertured end walls, one providing an inlet and the other providing an outlet, a hollow annular member slidably received within the chamber with the bore thereof opening to the inlet and outlet, the annular member including a plurality of passages extending between and opening to the ends thereof, resilient means seating between the other end wall of the chamber and one end of the annular member to seat the other end of the annular member against the one end wall of the chamber and close the passages to the inlet, and a fluid pressure rupturable diaphragm closing the bore of the annular member and defining therewith a piston, communication of the inlet to a source of pressure fluid to fill the vessel displacing the other end of the piston relative to the one end wall of the chamber against the resilient means to communicate the inlet and outlet through the passages and fill the vessel, the diaphragm being rupturable upon attainment of a predetermined pressure within the vessel to communicate the inlet and outlet through the bore of the annular member.

2. In combination with a vessel containing pressure fluid, a combined fill and pressure relief valve comprising, in combination, an annular housing assembly received within an opening in a wall of the vessel and including an annular chamber having spaced apertured end walls, one providing an inlet and the other providing an outlet, an annular member slidably received within the chamber and including a shouldered annular bore opening to the inlet and outlet, the annular member including a plurality of grooves in the periphery thereof and extending between and opening to the ends thereof, resilient means seating between the other end wall of the chamber and one end of the annular member to seat the other end of the annular member against the one end wall of the chamber and close the passages to the inlet, an annular fluid pressure rupturable diaphragm seating against the shoulder of the bore of the annular member to close such bore and define a piston with the annular member, and means retaining the diaphragm in place, communication of the inlet to a source of pressure fluid to fill the vessel displacing the other end of the piston relative to the one end wall of the chamber against the resilient means to communicate the inlet and outlet through the grooves and fill the vessel, the diaphragm being rupturable upon attainment of a predetermined pressure within the vessel to communicate the inlet and outlet through the bore of the annular member.

* * * * *

PO-1050
(5/69)

UNITED STATES PATENT OFFICE
CERTIFICATE OF CORRECTION

Patent No. 3,693,644          Dated September 26, 1972

Inventor(s) Vincent DiLorenzo

It is certified that error appears in the above-identified patent and that said Letters Patent are hereby corrected as shown below:

The inventor's name appears as "Vincent DiLorenzo" but should read -- Vincent DiLorenzo --.

Signed and sealed this 3rd day of July 1973.

(SEAL)
Attest:

EDWARD M. FLETCHER, JR.          Rene Tegtmeyer
Attesting Officer                Acting Commissioner of Patents